Patented Jan. 25, 1938

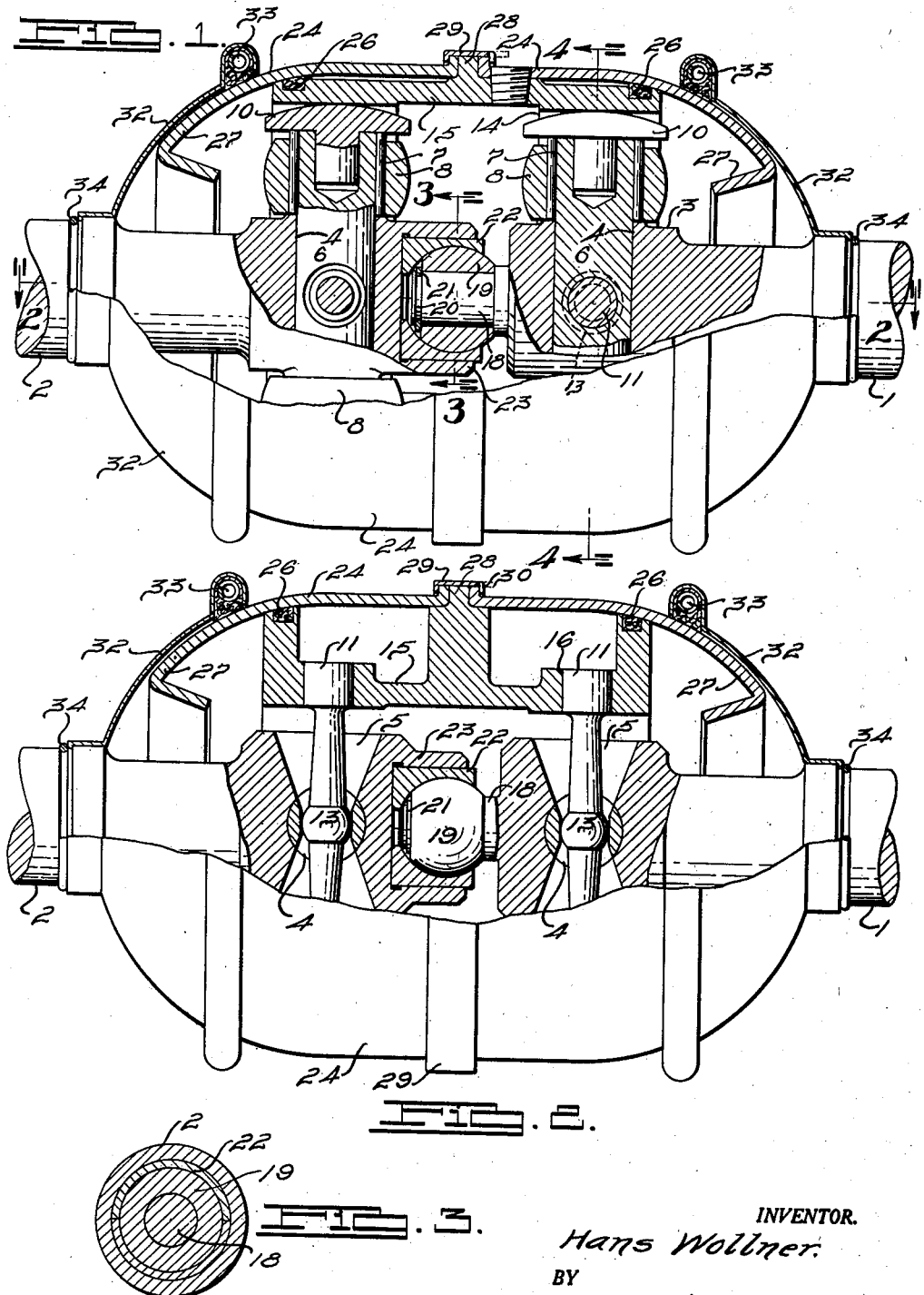

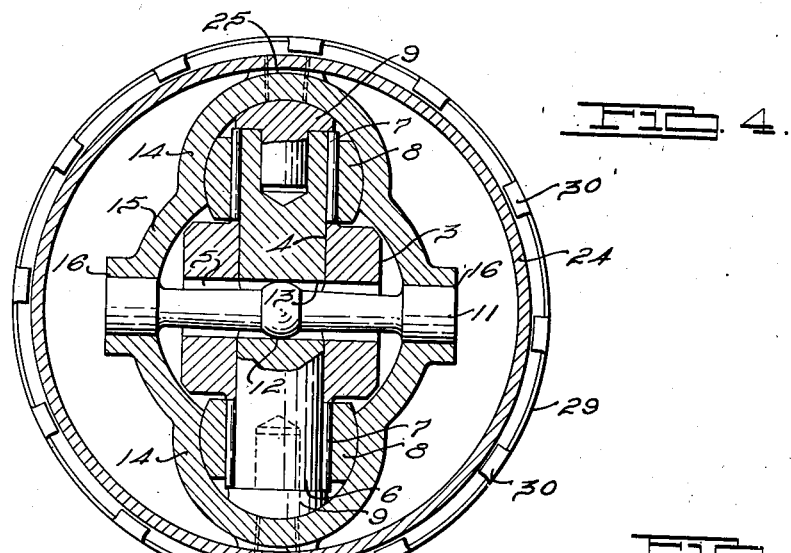
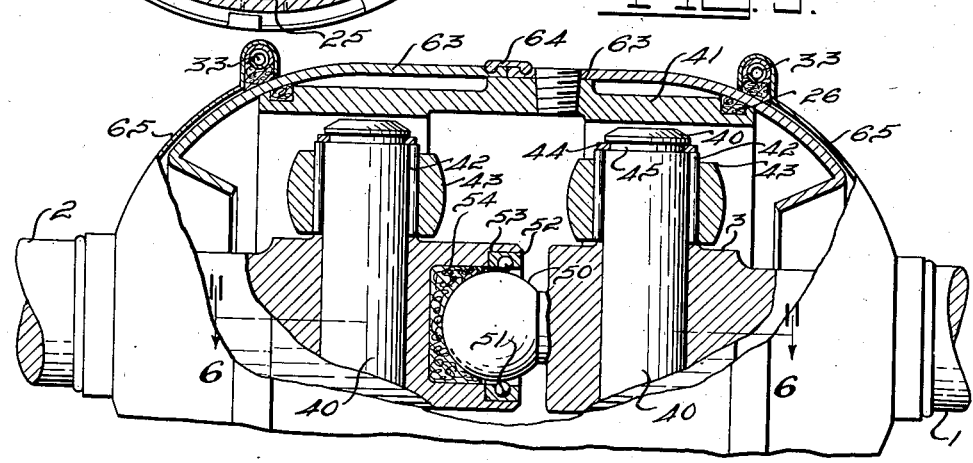
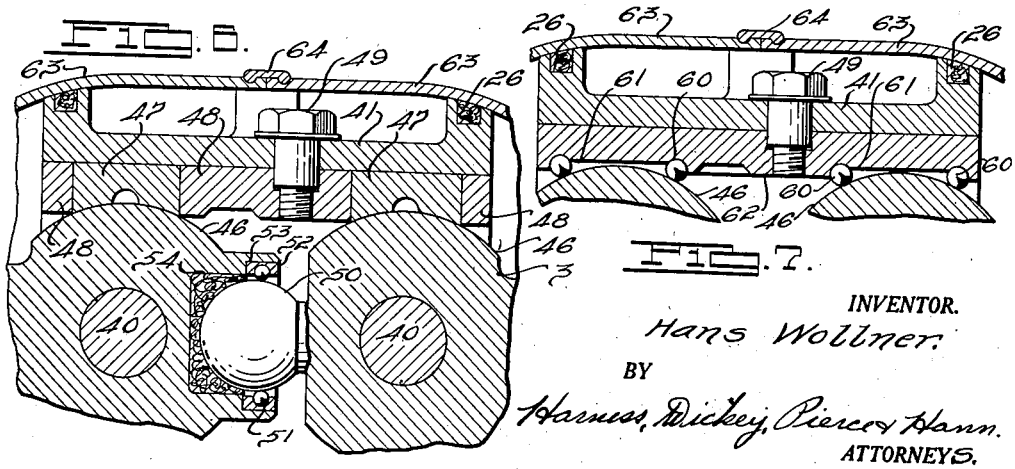

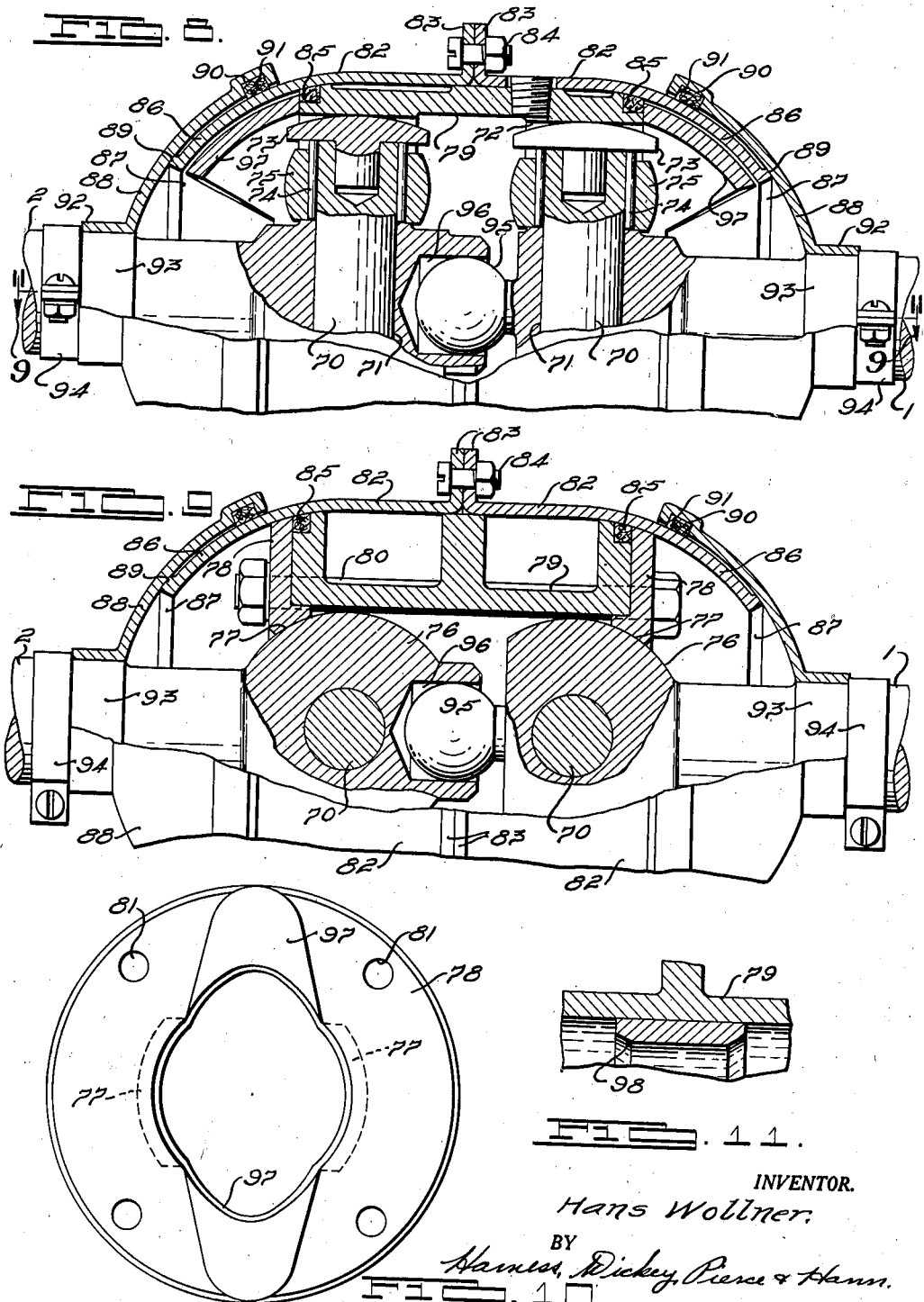

2,106,672

UNITED STATES PATENT OFFICE 2,106,672

UNIVERSAL JOINT MECHANISM

Hans Wollner, Detroit, Mich., assignor to Universal Products Co., Inc., a corporation of Delaware Application May 15, 1935, Serial No. 21,516

13 Claims. (Cl. 64—21)

The present invention relates to universal joints, and particularly to universal joints of the so-called "double" type, in which the rates of rotation of two connected sections of shafting are substantially uniform with respect to each other.

In universal joint constructions of the general type to which the present invention relates, each of two cooperating shaft sections is connected to an intermediate coupling member by single universal joint mechanism. In order to cause angular displacements of either shaft section with respect to the coupling to be substantially duplicated by the other shaft section, the inner ends of the shaft sections are ordinarily connected together by a compensating member which is movable with respect to the coupling.

In the embodiments of the above general arrangement with which the present applicant is aware, the couplings have been constructed to define the paths of movement of the associated compensating members. This arrangement may be caused to produce strict uniformity between the rates of rotation of the cooperating shaft sections, but is objectionable in that it involves the use of both a compensating member, and a somewhat complicated and expensive coupling.

In accordance with the present invention, a separate compensating member is unnecessary, and, in addition to the elimination of this element, the construction of the coupling may correspondingly be simplified. In the illustrated embodiments of the present invention, the inner ends of the cooperating shaft sections are formed with cooperating engaging surfaces, so constructed that angular displacement of either shaft with respect to the coupling produces a substantially equal angular displacement of the other shaft section.

The principal object of the present invention, accordingly, is to provide a universal joint of the so-called "double" type, in which compensating angular displacements of the shafts are introduced by the form of interconnection between the ends of the cooperating shaft sections. It is also an object of the present invention to improve and simplify the general form and arrangement of the parts for universal joints. It is also an object of the present invention to provide a universal joint of the double type which is simple in construction and which is capable of economical and ready manufacture and assembly. Other objects and advantages of the present invention appear in the following description and in the appended claims.

In the drawings:

Fig. 1 is a view in side elevation, partly in section, of a double universal joint embodying the present invention;

Fig. 2 is a view, with parts broken away, of a section taken on the line 2—2 of Fig. 1;

Fig. 3 is a sectional view taken on the line 3—3 of Fig. 1;

Fig. 4 is a sectional view taken on the line 4—4 of Fig. 1;

Fig. 5 is a view in side elevation, partly in section, of a modification of the present invention;

Fig. 6 is a partial sectional view taken on the line 6—6 of Fig. 5;

Fig. 7 is a partial sectional view showing a modification of the arrangement of Fig. 6;

Fig. 8 is a view in side elevation, partly in section, of a second modification of the present invention;

Fig. 9 is a view, partly in section, taken on the line 9—9 of Fig. 8;

Fig. 10 is a view in elevation of an end plate which may be used with the modifications shown in Figs. 8 and 9, and Fig. 11 is a partial sectional view of a modification of the arrangement shown in Fig. 9.

Referring to Figs. 1, 2 and 4, 1 and 2 represent shaft sections, either of which may be regarded as the driving member. Shafts 1 and 2 are each connected to a coupling 15 through members which form single universal joints individual to each shaft. The inner ends of shafts 1 and 2 are further connected together so that angular displacements of either shaft 1 or 2 with respect to coupling 15 are substantially duplicated by the other.

As best shown in Fig. 4, the portion 3 of shaft 1 is provided with two transverse openings 4 and 5. Opening 4 receives a pin 6, the ends of which are journaled in roller bearing assemblies, comprising rollers 7 and spherical sectors 8. Retaining buttons, each of which present one arcuate surface 9, in Fig. 4, and a second arcuate surface 10, in Fig. 1, are journaled in recesses cut into the ends of pin 6, and serve to maintain rollers 7 in the illustrated position. Surfaces 8 and 9 are concentric with portions 14 of coupling 15, and are somewhat loosely journaled therein. Surface 10 is concentric with the axis of pin 11, described below.

The other opening 5 formed in shaft 1 receives pin 11, a central ball section 12 of which is journaled in an opening 13 formed in pin 6 and the ends of which are journaled in coupling 15 at points 16. The ends of openings 5 and 13 are somewhat enlarged to permit a certain amount of rotation of shaft 1 and pin 4 about the axis of pin 6.

If shaft 1 is displaced in the plane of the paper, referring to Fig. 2, rotation is had about the axis of pin 6. If shaft 1 is displaced in the plane of the paper, with reference to Fig. 1, rotation is had about pin 11 as an axis. In this event, pin 6 also rotates about pin 11. Portions 14 of coupling 15 present linear surfaces, circular in cross section, so that as pin 6 rotates about pin 11, members 8 are caused to move somewhat nearer the ends of pin 6. It will be noted that the assembly of members 8 and 9 for movement axially of pin 6 permits the cylinder-like construction of portions 14, and so simplifies the manufacture of coupling 15.

The corresponding elements associated with shaft section 2 are as described with reference to those associated with shaft section 1.

Referring again to Figs. 1, 2, and 3, shaft section 1 terminates in a trunnion 18 upon which a spherical sector 19 is rotatably mounted. Trunnion 18 is provided with an annular groove 20 at the end thereof which receives a locking ring 21 provided to secure sector 19 in place. A segmented member 22, hollowed out to form a socket for sector 19, is slidably mounted in a recess 23 formed in the end of a shaft 2.

Because of the just described ball and socket connection between the ends of shaft sections 1 and 2, any angular displacement of either shaft section is accompanied by a substantially equal displacement of the other shaft section. In the course of any such displacement, member 19 rotates in socket 22, and socket 22 moves axially of shaft section 2. Accordingly, although under conditions of displacement of the shafts with respect to coupling 15, the rotation of coupling 15 is not uniform with respect to the rotation of the shafts, the shafts rotate at substantially the same rates.

It will be noted that the ball and socket connection between shafts 1 and 2 moves freely within coupling 15 but does not engage it. Accordingly, the inner surfaces of housing 15 need not be formed to provide guiding surfaces for such connection. This arrangement is advantageous in that it simplifies the manufacture of the assembly.

Coupling 15 is enclosed by an outer shell 24, which is formed of two similar cylinderlike sections, the outer ends of which are turned in at 27. The other ends of the sections rest upon raised portions 25 on coupling 15 (Fig. 4) and abut a shoulder 28 which extends outwardly from portions 25. Packing members 26 are provided adjacent the ends of coupling 15 for engagement by the respective shell sections. Clamp 29, provided to secure the shell sections in place, is formed as a channel, with portions of one of the vertical legs thereof cut away, leaving a plurality of spaced lugs 30, which are bent outwardly, as indicated in dotted lines, to permit the clip to be slipped over the end one shell section. When the two shell sections are positioned in assembled relation, the lugs 30 are bent inwardly as shown in full lines. Flexible boots 32, preferably formed of leather, are attached to the shells at points 33 and to shafts 1 and 2 at points 34.

Referring to Figs. 5 and 6, a modification is illustrated in accordance with which pin 11 (of Figs. 1, 2, and 4) may be eliminated. Referring to Fig. 5, shaft 1 is provided with a transverse opening into which pin 40 is fitted. The ends of pin 40 are supported in coupling 41 in substantially the manner described with reference to Figs. 1, 2, and 4, with the exception that rollers 42 and members 43 are maintained in place on pin 40 by means of retaining rings 44, which fit into annular recesses 45 formed in the end of pin 40.

Referring to Fig. 6, the two faces of section 3 which are parallel to the plane of Fig. 5, are finished as spherical sectors 46 which are concentric with the midpoint of the axis of the pin 40. Members 47, attached to coupling 41, are hollowed out to form cooperating surfaces for members 46.

With this arrangement, if shaft 1 or shaft 2 is displaced in the plane of the paper, referring to Fig. 5, surfaces 46 rotate with respect to their associated surfaces 47. This action rotates pin 40 about an axis perpendicular to its own axis, in response to which the members 43 move as described in connection with Figs. 1, 2, and 4, and assume positions slightly nearer the ends of pin 40. If shaft 1 is displaced in a plane perpendicular to the plane of the paper, referring to Fig. 5, pin 40 rotates in its bearings 42 and 43, and a sliding movement occurs between surfaces 46 and 47.

Corresponding parts associated with shaft 2 are correspondingly arranged.

In the embodiment shown in Figs. 5 and 6, the ends of shafts 1 and 2 may be connected together by means of a ball and socket unit, as described in connection with Figs. 1, 2, and 4. A modified form of ball and socket unit is, however, illustrated in Figs. 5 and 6, and comprises a ball 50 formed at the end of shaft 1, which is engaged by a ball bearing ring comprising balls 51 and retaining ring 52. The inner surface of ring 52 is arcuate and conforms to the curvature of ball 50. Ring 52 may be slidably fitted into a circumferential recess 53 formed in the end of shaft 2, or alternatively, ring 52 may be tightly fitted, and balls 51 mounted loosely enough to permit ball 50 to move axially of ring 52. The region marked 54 is preferably filled with a lubricating packing.

The members 47 associated with both shafts 1 and 2 may be formed of a single piece of metal, but preferably are formed of separate pieces, as illustrated in Fig. 6, suitable spacers 48 being added to properly locate them with respect to their cooperating surfaces. As illustrated in Fig. 6, a cap screw 49 may be employed to attach the assembly comprising members 47 and 48 to the coupling 41.

Referring to Fig. 7, elements 47 may be replaced by two roller bearings, such as 60, fitted into recesses 61 cut into the face of a single supporting member 62, attached to coupling 41 by cap screw 49.

As described in connection with Figs. 1, 2, 3, and 4, coupling 41 of Figs. 5, 6 and 7 is preferably provided with outer shells 63, which may be connected together by clips 64, and with boots 65.

Referring to Figs. 8 and 9, a construction is illustrated in which the shaft sections 1 and 2 are fixed longitudinally of the coupling, partly by end plates and partly by cup-like portions of the outer enclosing shell. Pin 70 is fitted into an opening 71 formed in the end of shaft section 1, and is journaled in coupling 72 in the manner described in connection with Figs. 1, 2, and 4, by means of buttons 73 and roller bearing structure comprising rollers 74 and spherical sectors 75. The corresponding parts associated with top section 2 are correspondingly arranged.

Referring to Fig. 9, the ends of shafts 1 and 2 are each formed as spherical sectors 76. Surfaces 77 formed on end plates 78 form socket-like journals for sectors 76, and prevent longitudinal outward movement of shafts 1 and 2 with respect to coupling 79. End plates 78 are preferably attached to coupling 79 by bolts 80, passed through openings 81.

Coupling 79 is surrounded by two duplicate outer shells 82 of cylinder-like form, which are secured together by bolts 84 passed through rims 83, packing members 85 being interposed between shells 82 and coupling 79 adjacent the ends of the latter. Ends 86 of shells 82 are cupped, concentrically with the midpoint of the axis of pin 70. Circular openings in end sections 86, bounded by surfaces 87, permit angular displacement of shafts 1 and 2 with respect to coupling 79.

Cup-like end sections 88, which prevent longitudinal inward movement of shafts 1 and 2 with respect to coupling 79, are concentric with the midpoints of the axis of pin 70, engage shoulders 89 formed on sections 86, and are provided with recesses 90 to receive packing rings 91. Cylinder-like portions 92 of end sections 88 are fitted upon cooperating shoulders 93 on shafts 1 and 2.

The simplified form of interconnection between the inner ends of shafts 1 and 2 comprises a sphere 95 formed at the inner end of shaft 1 which is slidably and rotatably fitted into a recess 96 formed at the end of shaft 2. As in the previously described modifications, this causes angular displacements of either shaft 1 or 2 with respect to coupling 79 to be substantially duplicated by the other.

In operation, if shafts 1 and 2 are displaced in planes perpendicular to the plane of Fig. 8, pins 70 rotate about their own axes in the associated roller bearing assemblies; surfaces 76 slide within the spheroidal surfaces 77 and end sections 88 slide along the spheroidal surfaces 86. If the shafts are displaced in the plane of Fig. 8, surfaces 76 and 86 slide as above mentioned along their cooperating surfaces 77 and 86. In the course of this movement, pins 70 rotate about an axis which passes perpendicularly through the mid-point of its own axis. In the course of this rotation, members 73 and 75 move linearly in the associated coupling portions in the manner described in connection with Figs. 1, 2 and 4. As shown in Figs. 8 and 10, end plates 78 are provided with recesses 97 to accommodate such movement of members 73 and 75.

Referring to Fig. 11, the journaling function of end sections 88 may alternatively be accomplished by spheroidal bearing surfaces 98 formed on the interior of coupling 79. With this latter arrangement, surfaces 98 and 77 operate to positively locate shafts 1 and 2 with respect to coupling 79.

Although specific embodiments of the present invention have been shown and described, various modifications may be made therein without departing from the spirit and scope of the present invention. It is to be understood, therefore, that the described embodiments are to be regarded in an illustrative and not in a limiting sense.

What is claimed is.

1. Universal joint mechanism comprising a shaft; a longitudinally extending coupling angularly displaceable relative to said shaft; and means for universally connecting said shaft to said coupling comprising a pair of pins passed through said shaft with their axes normal to each other, one of said pins being journaled in said coupling to fix said shaft longitudinally of said coupling, and the other of said pins being disposed to engage said coupling at any of a plurality of points therealong in accordance with the angle of displacement between said coupling and said shaft to cause rotation of said coupling in response to rotation of said shaft.

2. Universal joint mechanism comprising a pair of shafts; a longitudinally extending coupling angularly displaceable relative to said shafts; a pair of pins individual to each of said shafts and passed therethrough with their axes substantially normal to each other and supported in said coupling, one pin of each pair being adapted to fix the associated shaft in place longitudinally of said coupling, and the other pin of each pair being adapted to engage said coupling at any of a plurality of points therealong in accordance with the angle of displacement between said coupling and the associated shaft to cause rotation of said coupling in response to rotation of said shaft; and means for pivotally interconnecting the ends of said shafts.

3. Universal joint mechanism comprising a section of shafting having two openings extending therethrough transversely to the axis of said section and intersecting at substantially said axis; a longitudinally extending coupling angularly displaceable relative to said shaft section, a pin passing through one of said openings and having its ends secured in said coupling to fix said section longitudinally of said coupling; and a second pin extending through said other opening, the ends whereof are disposed to engage said coupling at any of a plurality of points therealong in accordance with the angle of displacement between said coupling and said shaft section and form a rotative driving connection between said section and said coupling.

4. Universal joint mechanism comprising a section of shafting having two openings passing therethrough transversely of the axis of said section and intersecting at substantially said axis; a longitudinally extending coupling member angularly displaceable relative to said shaft section; a pin passing through one of said openings and having its ends secured within said coupling to fix said section longitudinally of said coupling; a second pin passing through the other of said openings and having its ends disposed to engage said coupling at any of a plurality of points therealong in accordance with the angle of displacement between said coupling and said shaft section to form a rotative driving connection between said section and said coupling; one of said pins having a transverse opening through which the other of said pins passes.

5. Universal joint mechanism comprising, in combination, a first shaft section; a second shaft section; a longitudinally extending housing angularly displaceable relative to said shafts and adapted to receive the inner ends of each of said shafts; means including bearing surfaces carried on each of said shafts and cooperating bearing surfaces formed within said housing for securing said shaft sections within said housing; means interconnecting the inner ends of said shaft sections so that angular movement of one of said shaft sections relative to said housing is accompanied by angular movements of the other of said shaft sections; and additional means cooperating between each shaft section and said housing for transmitting rotative force between said housing and the associated shaft section.

6. Universal joint mechanism comprising, in combination, a first shaft section; a second shaft section; a longitudinally extending housing angularly displaceable relative to said shafts and adapted to receive the inner ends of each of said shafts; means including a pair of transversely opposite spheroidal bearing surfaces carried on each of said shafts and cooperating bearing surfaces formed within said housing for securing said shaft sections within said housing; means interconnecting the inner ends of said shaft sections so that angular movement of one of said shaft sections relative to said housing is accompanied by angular movement of the other of said shaft sections; and additional means cooperating between each shaft section and said housing for transmitting rotative force between said housing and the associated shaft section, said additional means extending substantially normal to a median line connecting said bearing surfaces.

7. Universal joint mechanism comprising, in combination, a first shaft section; a second shaft section; a longitudinally extending housing angularly displaceable relative to said shafts and adapted to receive the inner ends of each of said shafts; means including a pair of transversely opposite spheroidal bearing surfaces on each of said shafts and cooperating bearing surfaces formed within said housing for securing said shaft sections within said housing; means interconnecting the inner ends of said shaft sections so that angular movement of one of said shaft sections relative to said housing is accompanied by angular movement of the other of said shaft sections; and a pair of axially parallel trunnions projecting from opposite sides of each of said shaft sections, said spheroidal bearing surfaces lying on opposite sides of the axes of said pairs of trunnions; and mean defining raceways within said housing for receiving said trunnions to transmit rotative force between said housing and said shaft sections.

8. Universal joint mechanism comprising, in combination, a first shaft section; a second shaft section; a longitudinally extending housing angularly displaceable relative to said shafts, said housing having a first pair of longitudinal interior raceway portions formed adjacent one end thereof and a second pair of longitudinal interior raceway portions formed adjacent the other end thereof; a driver for each shaft section extending transversely thereof with its ends slidably received in the raceway portions of the associated pair and cooperable therewith to transmit axial rotative force between said housing and said shaft sections; means interconnecting the inner ends of said shaft sections so that angular movement of one of said shaft sections relative to said housing is accompanied by angular movement of the other of said shaft sections; and additional means individual to each shaft section and cooperating between the associated shaft section and said housing for securing the associated shaft section within said housing.

9. Universal joint mechanism comprising, in combination, a first shaft section; a second shaft section; a longitudinally extending housing angularly displaceable relative to said shafts, said housing having a first pair of longitudinal interior raceway portions formed adjacent one end thereof, and a second pair of longitudinal interior raceway portions formed adjacent the other end thereof; a driver for each shaft section extending transversely thereof with its ends slidably received in the raceway portions of the associated pair and cooperable therewith to transmit axial rotative force between said housing and said shaft sections; means interconnecting the inner ends of said shaft sections so that angular movement of one of said shaft sections relative to said housing is accompanied by angular movement of the other of said shaft sections; and additional means comprising opposed spheroidal surfaces formed adjacent the end of each of said shaft sections and cooperating surfaces provided in said housing for cooperating between the associated shaft section and said housing to secure the shaft sections within said housing.

10. Universal joint mechanism comprising, in combination, a first shaft section; a second shaft section; a longitudinally extending housing angularly displaceable relative to said shafts, said housing having a first pair of longitudinal interior raceway portions formed adjacent one end thereof, and a second pair of longitudinal interior raceway portions formed adjacent the other end thereof; a driver for each shaft section extending transversely thereof with its ends slidably received in the raceway portions of the associated pair and cooperable therewith to transmit axial rotative force between said housing and said shaft sections; means interconnecting the inner ends of said shaft sections so that angular movement of one of said shaft sections relative to said housing is accompanied by angular movement of the other of said shaft sections; a pair of diametrically opposed spheroidal surfaces formed adjacent the end of each of said shaft sections, and a roller bearing element in said housing for each of said surfaces for cooperating therewith to secure said shaft sections within said housing.

11. Universal joint mechanism comprising, in combination, a first shaft section; a second shaft section; a longitudinally extending housing angularly displaceable relative to said shafts and adapted to receive the inner ends of each of said shafts; means including a pair of transversely opposite bearing surfaces carried on each of said shafts and cooperating bearing surfaces formed within said housing and securing said shaft sections against axial movement out of said housing; means including a supplemental housing member individual to each of said shaft sections and cooperating between the associated shaft section and said housing for securing the associated shaft section against axial movement into said housing; means interconnecting the inner ends of said shaft sections so that angular movement of one of said shaft sections relative to said housing is accompanied by angular movement of the other of said shaft sections; and additional means cooperating between each shaft section and said housing for transmitting rotative force between said housing and the associated shaft section.

12. Universal joint mechanism comprising, in combination, a first shaft section; a second shaft section; a longitudinally extending housing angularly displaceable relative to said shafts, said housing having a first pair of longitudinal interior raceway portions formed adjacent one end thereof, and a second pair of longitudinal interior raceway portions formed adjacent the other end thereof; a driver for each shaft section extending transversely thereof with its ends slidably received in the raceway portions of the associated pair and cooperable therewith to transmit axial rotative force between said housing and said shaft sections; means interconnecting the inner ends of said shaft sections so that angular movement of one of said shaft sections relative to said housing is accompanied by angular movement of the other of said shaft sections; additional means comprising diametrically opposed spheroidal surfaces formed adjacent the end of each of said shaft sections and cooperating surfaces provided in said housing for cooperating between the associated shaft section and said housing to secure the associated shaft section against axial movement out of said housing; and means including a supplemental housing member individual to each shaft section and cooperating between the associated shaft section and said housing for securing the associated shaft section against axial movement into said housing.

13. Universal joint mechanism comprising, in combination, a longitudinally extending housing; first and second shaft sections angularly displaceable relative to said housing and having their inner ends interconnected and received within said housing; said housing having a first pair of longitudinal interior raceway portions formed adjacent one end thereof and a second pair of longitudinal interior raceway portions formed adjacent the other end thereof; a driver for each shaft section extending transversely thereof with its ends slidably received in the raceway portions of the associated pair and cooperable therewith to transmit axial rotative force between said housing and said shaft sections; and means connecting said shaft sections to said housing so as to retain said shaft sections within said housing.

HANS WOLLNER.